United States Patent
Curticapean et al.

(10) Patent No.: US 11,356,835 B2
(45) Date of Patent: Jun. 7, 2022

(54) DISCOVERY METHOD FOR WIRELESS COMMUNICATION SYSTEMS

(71) Applicant: WIREPAS OY, Tampere (FI)

(72) Inventors: Florean Curticapean, Tampere (FI); Hannu Hirvi, Tampere (FI); Ville Kaseva, Tampere (FI)

(73) Assignee: WIREPAS OY, Tampere (FI)

( * ) Notice: Subject to any disclaimer, the term of this patent is extended or adjusted under 35 U.S.C. 154(b) by 118 days.

(21) Appl. No.: 16/138,108

(22) Filed: Sep. 21, 2018

(65) Prior Publication Data

US 2020/0100086 A1 Mar. 26, 2020

(51) Int. Cl.

| | | |
|---|---|---|
| H04W 72/08 | (2009.01) | |
| H04W 8/00 | (2009.01) | |
| G06K 19/07 | (2006.01) | |
| H04B 17/318 | (2015.01) | |
| H04L 5/00 | (2006.01) | |
| H04W 52/24 | (2009.01) | |

(52) U.S. Cl.
CPC ........ H04W 8/005 (2013.01); G06K 19/0723 (2013.01); H04B 17/318 (2015.01); H04L 5/0053 (2013.01); H04W 52/24 (2013.01)

(58) Field of Classification Search
None
See application file for complete search history.

(56) References Cited

U.S. PATENT DOCUMENTS

| | | | |
|---|---|---|---|
| 2006/0003769 A1* | 1/2006 | Liu | H04W 36/00837 455/436 |
| 2006/0276206 A1* | 12/2006 | Shiotsu | G06K 7/0008 455/462 |
| 2007/0167139 A1 | 7/2007 | Inano et al. | |

(Continued)

FOREIGN PATENT DOCUMENTS

| | | |
|---|---|---|
| EP | 0 727 752 | 8/1996 |
| JP | 2015-115782 | 6/2015 |
| WO | 2011/028843 A2 | 3/2011 |

OTHER PUBLICATIONS

European Search Report issued in European Patent Application No. EP 19 19 7150 dated Nov. 12, 2019.

(Continued)

*Primary Examiner* — Brandon M Renner
(74) *Attorney, Agent, or Firm* — Nixon & Vanderhye

(57) ABSTRACT

Disclosed is a wireless communication system, including one or more monitoring devices and one or more asset tag devices. The one or more monitoring devices are configured to: transmit a beacon frame on at least one first communication channel and listen to the second communication channel. The one or more asset tag devices are configured to: scan at least one first communication channel to receive at least one beacon frame; select a monitoring device; switch to the second communication channel indicated in the beacon frame; and initiate communication with the selected monitoring device on the second communication channel. The selected monitoring device is further configured to (Continued)

communicate with the one or more asset tag devices on the second communication channel. Also disclosed are discovery methods, an asset tag device and a monitoring device for the wireless communication system.

17 Claims, 11 Drawing Sheets

(56) References Cited

U.S. PATENT DOCUMENTS

| | | | | |
|---|---|---|---|---|
| 2013/0058298 | A1* | 3/2013 | Xu | H04W 48/16 370/329 |
| 2014/0376392 | A1* | 12/2014 | Hegde | H04W 48/16 370/252 |
| 2016/0128021 | A1* | 5/2016 | Wadhawan | H04W 76/10 370/312 |
| 2016/0165649 | A1* | 6/2016 | Polo | H04W 12/02 455/411 |
| 2016/0219408 | A1* | 7/2016 | Yang | H04W 52/0241 |
| 2016/0234420 | A1* | 8/2016 | Lee | H04N 1/00315 |
| 2017/0041954 | A1* | 2/2017 | Tsai | H04W 16/14 |
| 2017/0245280 | A1* | 8/2017 | Yi | H04K 3/226 |

OTHER PUBLICATIONS

GB Search Report for Application No. GB1815419 5, dated Apr. 8, 2019.

Examination Report issued in GB Patent Application No. GB1815419.5 dated Nov. 17, 2020.

Examination Report under Section 18(3) issued in GB Patent Application No. 1815419.5 dated Jul. 28, 2021.

* cited by examiner

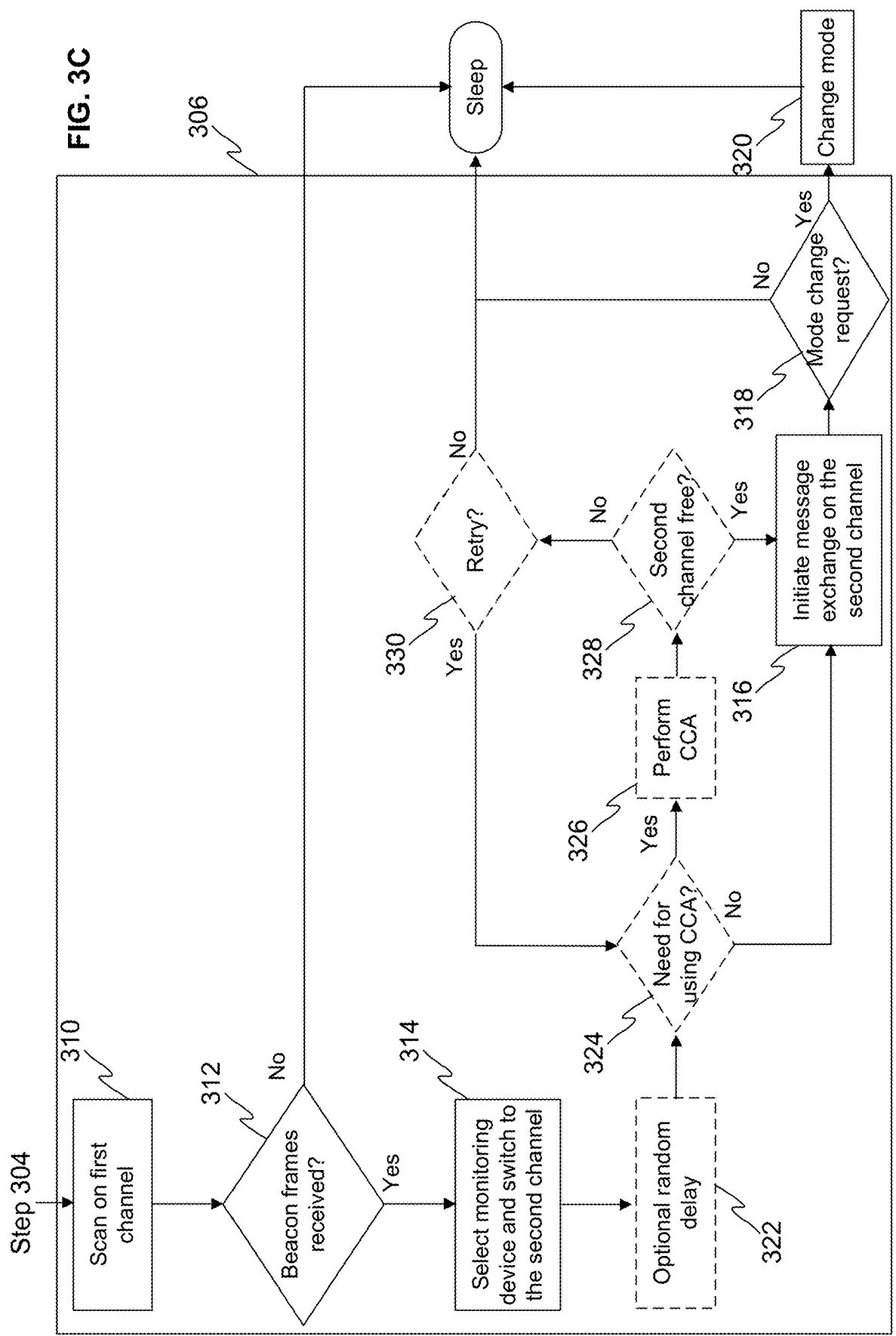

DISCOVERY METHOD FOR WIRELESS COMMUNICATION SYSTEMS

TECHNICAL FIELD

The invention concerns in general the technical field of wireless communication systems. Especially the invention concerns discovery of asset tag devices.

BACKGROUND

The usage of very low power consuming radio technologies is becoming more and more common in various use cases, for example in asset management. The low cost, ease of installation and reasonably long battery life encourage to attach trackable radio tags not only in the most expensive assets, but also to mass products. The assets may need to be discovered and tracked when being in a warehouse or while being moved, e.g. on a production line, while doing inventory for goods in/out, during the transport, and/or at the resales. The "assets" may not only be goods, but the tag-based tracking can also be applied e.g. on animals and people. For example, people participating in mass-sports events like marathon could be tracked at the start, during the route and at the finish line. However, no matter what the assets are, there are still significant challenges to discover reliably high numbers of radio equipped assets within short time.

An example of a radio system used for asset management is RFID. A general issue of the system is to avoid waking up all the asset tags at the same time and colliding with each other. Also, operating range of RFID passive tags is very limited.

Another example radio system used for asset management is Bluetooth Low Energy (BLE). Each asset is attached with BLE radio tag, and each of them applies BLE's advertising protocol. The advertising protocol uses three out of 40 frequency channels for transmitting advertising packets with (almost) regular interval. Meanwhile, the monitoring devices apply BLE's scanning to discover the asset tags on the advertising channels. The interval of advertisements can be pre-configured for each BLE radio tag. The more frequently the radio tag transmits, the faster the asset can be found, but the more it also uses the spectrum and battery resources.

When the number of the transmitted advertising packets is increased on the same area, the number of simultaneous transmissions, i.e. collisions, increases as well. This decreases the probability that the monitoring devices receive the advertising packets correctly. In other words, the advertising radio tags cannot be reliably monitored when their density is getting higher. This is not an issue only for BLE. None of the existing radio technologies is designed particularly to address the fast discovery of high numbers of low-power radio tags.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a wireless communication system, device discovery methods, an asset tag device, a monitoring device, computer program products, and computer-readable mediums. Another objective of the invention is that the wireless communication system, the discovery methods, the asset tag device, the monitoring device, the computer programs, and the computer-readable mediums improve discovery of asset tag devices in a dense wireless communication system.

The objectives of the invention are reached by a wireless communication system, discovery methods, an asset tag device, a monitoring device, computer programs, and computer-readable mediums as defined by the respective independent claims.

According to one embodiment, a wireless communication system comprising one or more monitoring devices and one or more asset tag devices is provided. The one or more monitoring devices are configured to: transmit a beacon frame on at least one first communication channel, at least once per beacon interval, the beacon frame comprising information of a second communication channel; and listen to the second communication channel. The one or more asset tag devices operating in a first operating mode are configured to: scan at least one first communication channel to receive at least one beacon frame transmitted by the one or more monitoring devices; select a monitoring device based on at least one selection criterion; switch to the second communication channel indicated in the beacon frame transmitted by the selected monitoring device; and initiate communication with the selected monitoring device on the second communication channel. The selected monitoring device is further configured to communicate with the one or more asset tag devices on the second communication channel in response to receiving an initialization message from the one or more asset tag devices.

According to one embodiment, an asset tag device (apparatus) for a wireless communication system in accordance with the previous embodiment is provided. The asset tag device comprises: a microcontroller and a radio transceiver. The asset tag device being in first operating mode is configured to: scan, by the radio transceiver, at least one first communication channel to receive at least one beacon frame transmitted by one or more monitoring devices; select, by the microcontroller, a monitoring device based on at least one selection criterion; switch, by the microcontroller, to the second communication channel indicated in the beacon frame transmitted by the selected monitoring device; and initiate, by the radio transceiver, communication with the selected monitoring device on the second communication channel.

According to one embodiment, a discovery method for the asset tag device of a wireless communication system in accordance with the previous embodiments is provided. The method comprises: scanning at least one first communication channel to receive at least one beacon frame transmitted from one or more monitoring devices; selecting a monitoring device based on at least one selection criterion, in response to receiving at least one beacon frame; switching to the second communication channel indicated in the beacon frame transmitted by the selected monitoring device; and initiating communication with the selected monitoring device on the second communication channel.

According to one embodiment, a computer program (software) for discovery by means of the asset tag device of a wireless communication system in accordance with the previous embodiments, when run in the asset tag device (computer) is provided. The program comprises: scanning code for scanning at least one first communication channel to receive at least one beacon frame transmitted from one or more monitoring devices; selection code for selecting a monitoring device based on at least one selection criterion, in response to receiving at least one beacon frame; switching code for switching to the second communication channel indicated in the beacon frame transmitted by the selected monitoring device; and initiation code for initiating communication with the selected monitoring device on the second communication channel.

According to one embodiment, a tangible non-volatile computer readable medium comprising the computer program in accordance with the previous embodiment is provided. The program for discovery is performed by means of the asset tag device of a wireless communication system in accordance with the previous embodiments, when run in the asset tag device. The program comprises: scanning code for scanning at least one first communication channel to receive at least one beacon frame transmitted from one or more monitoring devices; selection code for selecting a monitoring device based on at least one selection criterion, in response to receiving at least one beacon frame; switching code for switching to the second communication channel indicated in the beacon frame transmitted by the selected monitoring device; and initiation code for initiating communication with the selected monitoring device on the second communication channel.

According to one embodiment, a monitoring device (apparatus) for wireless communication system in accordance with previous embodiments is provided. The monitoring device comprises a microcontroller and one or more radio transceivers. The monitoring device is configured to: transmit, by the one or more radio transceivers, a beacon frame on at least one first communication channel, at least once per beacon interval, the beacon frame comprising information of a second communication channel; listen, by the one or more radio transceivers, to the second communication channel; and communicate, by the one or more radio transceivers, with one or more asset tag devices on the second communication channel in response to receiving an initialization message from the one or more asset tag devices.

According to one embodiment a discovery method for the monitoring device of a wireless communication system in accordance with the previous embodiments is provided. The method comprises: transmitting a beacon frame on at least one first communication channel, at least once per beacon interval, the beacon frame comprising information of a second communication channel; listening to the second communication channel; communicating with the one or more asset tag devices on the second communication channel in response to receiving an initialization message from one or more asset tag devices.

According to one embodiment, a computer program (software) for discovery by means of the monitoring device of a wireless communication system in accordance with the previous embodiments, when run in the monitoring device (computer) is provided. The program comprises: transmitting code for transmitting a beacon frame on at least one first communication channel, at least once per beacon interval, the beacon frame comprising information of a second communication channel; listening code for listening to the second communication channel; communication code for communicating with the one or more asset tag devices on the second communication channel in response to receiving an initialization message from one or more asset tag devices.

According to one embodiment, a tangible non-volatile computer readable medium comprising the computer program in accordance with the previous embodiment is provided. The program for discovery is performed by means of the monitoring device of a wireless communication system in accordance with the previous embodiments, when run in the monitoring device. The program comprises: transmitting code for transmitting a beacon frame on at least one first communication channel, at least once per beacon interval, the beacon frame comprising information of a second communication channel; listening code for listening to the second communication channel; communication code for communicating with the one or more asset tag devices on the second communication channel in response to receiving an initialization message from one or more asset tag devices.

Further embodiments are disclosed in the dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIGS. 3A-3E schematically illustrate examples of a method for discovery of asset tag devices according to the invention from the perspective of an asset tag device.

DESCRIPTION OF THE EXEMPLIFYING EMBODIMENTS

Figure 1:
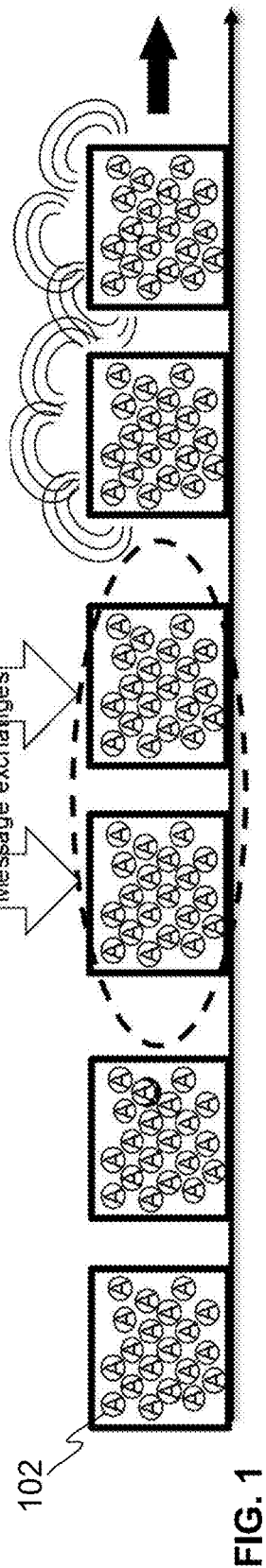
FIG. 1 illustrates schematically an example environment wherein a wireless communication system according to the invention may be implemented.

FIG. 1 illustrates schematically an example environment wherein a wireless communication system 100 according to the invention may be implemented. The wireless communication system 100 comprises one or more monitoring devices 104 and one or more asset tag devices 102. In this example environment a large amounts of asset tag devices 102 are stored close to each other, e.g. inside a warehouse, and the one or more monitoring devices 104 are arranged in the warehouse, e.g. locations goods in/out inventory is to be made.

In the example setup illustrated in FIG. 1 the monitoring devices 104 may discover and configure directly each of the one or more asset tag devices 102 from a first operating mode into a second operating mode. The implementation of the operation modes of the one or more asset tag devices 102 may depend e.g. on the asset tag device 102 density, available time for the discovery and the number of monitoring devices 104.

The first operating mode may be a high-capacity mode, e.g. "a warehouse mode", that is used when the one or more asset tag devices 102 are located inside the warehouse. In the high-capacity mode, like in warehouse, the one or more asset tag devices 102 may be configured to be in an operating mode, in which any unnecessary transmissions are avoided for improved detection time. In such mode the one or more asset tag devices 102 may be configured to e.g. transmit only when they know the presence of a monitoring device 104; use channel sensing before their own transmissions; and/or spread into multiple, likely tens of, separate communication channels to decrease the probability of collisions and channel jamming.

When the one or more asset tag devices 102 are moved out from the warehouse, the one or more asset tag devices 102 and the one or more monitoring devices 104 run a discovery process, i.e. method. During the discovery process, the one or more monitoring devices 104 may configure the one or more asset tag devices 102 into the second operating mode, i.e. low-capacity mode, e.g. "transport mode". In the low-capacity mode, like during transport or at the resales phase, the one or more asset tag devices 102 may be configured to be in an operating mode where they may use transmissions in a non-coordinated manner, such as according to Bluetooth Low Energy (BLE) advertising protocol, assuming a low probability of collisions and channel jamming. The discovery process, i.e. method, will be described more later in this application.

Figure 2:
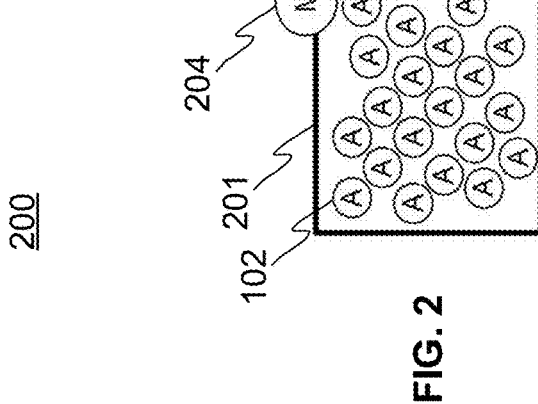
FIG. 2 illustrates schematically another example environment wherein a wireless communication system according to the invention may be implemented.

FIG. 2 illustrates schematically another example environment 200 wherein the wireless communication system 200 according to the invention may be implemented. In this example environment large amount of asset tag devices 102 are stored in containers 201 in a warehouse and one or more monitoring devices 104 are arranged in the warehouse. In addition, one or more second monitoring devices 204 are attached to the containers 201. Alternatively or in addition, one or more asset tag devices 102 may be configured to change their role into second monitoring device 204 and act as a second monitoring device 204. In the example setup illustrated in FIG. 2 the monitoring devices 104 arranged to the warehouse discover and configure the one or more second monitoring devices 204 attached in the containers 201 first. Then, during the transportation the second monitoring device 204 attached to the container 201 discovers and configures the one or more asset tag devices 102 from a first operating mode, i.e. the high-capacity mode, e.g. "a warehouse mode", into a second operating mode, i.e. the low-capacity mode, e.g. "transport mode".

When the one or more asset tag devices 102 are moved out from the warehouse, the one or more monitoring devices 104 arranged in the warehouse inform the one or more second monitoring devices 204 attached to the containers 201 about their exit. This activates the one or more second monitoring devices 204 attached to the containers 201 to start discovery process of the one or more asset tag devices 102. The one or more second monitoring devices 204 attached to the containers discover the one or more asset tag devices 102 and configure them into the second operating mode from the first operating mode.

Alternatively, when containers 201 are exiting a warehouse, an asset tag device 102 is detected by the monitoring device 104 according the invention, the monitoring device 104 commands the asset tag device 102 to start operating as a second monitoring device 204 and report all asset tag devices 102 inside the container 201. The report may be sent directly to a monitoring device 104 or it may be routed through some other second monitoring devices 204, even over multiple radio hops, i.e. through multiple other second monitoring devices 204. For example, if the inventory is made during the transporting, the reports may be collected by one or more second monitoring devices 204 and sent to a monitoring device 104. Such monitoring device 104 may be installed in the transportation vehicle, e.g. a truck, or the monitoring device 104 may be at a destination warehouse.

Having a second monitoring device 204 included or attached to a container is highly beneficial operation when the container is metallic for example airplane or ship cargo container which may shield electromagnetic signals in efficient manner. In such installations one asset tag devices 102 may have been configured with a first antenna outside of the container and a second antenna inside the container. This configuration allows efficient communication 1) by utilizing the first antenna in communication with a monitoring device 104 when operating in an asset tag device mode and 2) by utilizing the second antenna inside the container the communication when communicating as second monitoring device mode 204 with other asset tag devices 102 inside the container. Finally, the first external antenna may be used to communicate the information gathered from asset tag devices 102 inside the container 201 towards warehouse monitoring device 104.

In the above presented examples, the assets are discovered and tracked when being in a warehouse or while being moved, e.g. on a production line, while doing inventory for goods in/out, during the transport, and/or at the resales. However, the "assets" may not only be goods, but the tag-based tracking and discovery according to the invention may also be applied e.g. on animals and people. For example, people participating in mass-sports events like marathon may be tracked at the start, during the route and at the finish line.

FIGS. 3A-3E schematically illustrate examples of a method for discovery of asset tag devices in a dense network, i.e. wireless communication system, according to the invention from the perspective of the asset tag device 102. A dense network refers throughout this application to a network comprising high number of asset tag devices 102, such as several hundreds or thousands, e.g. 1000, asset tag devices 102, within network.

Figure 3A:
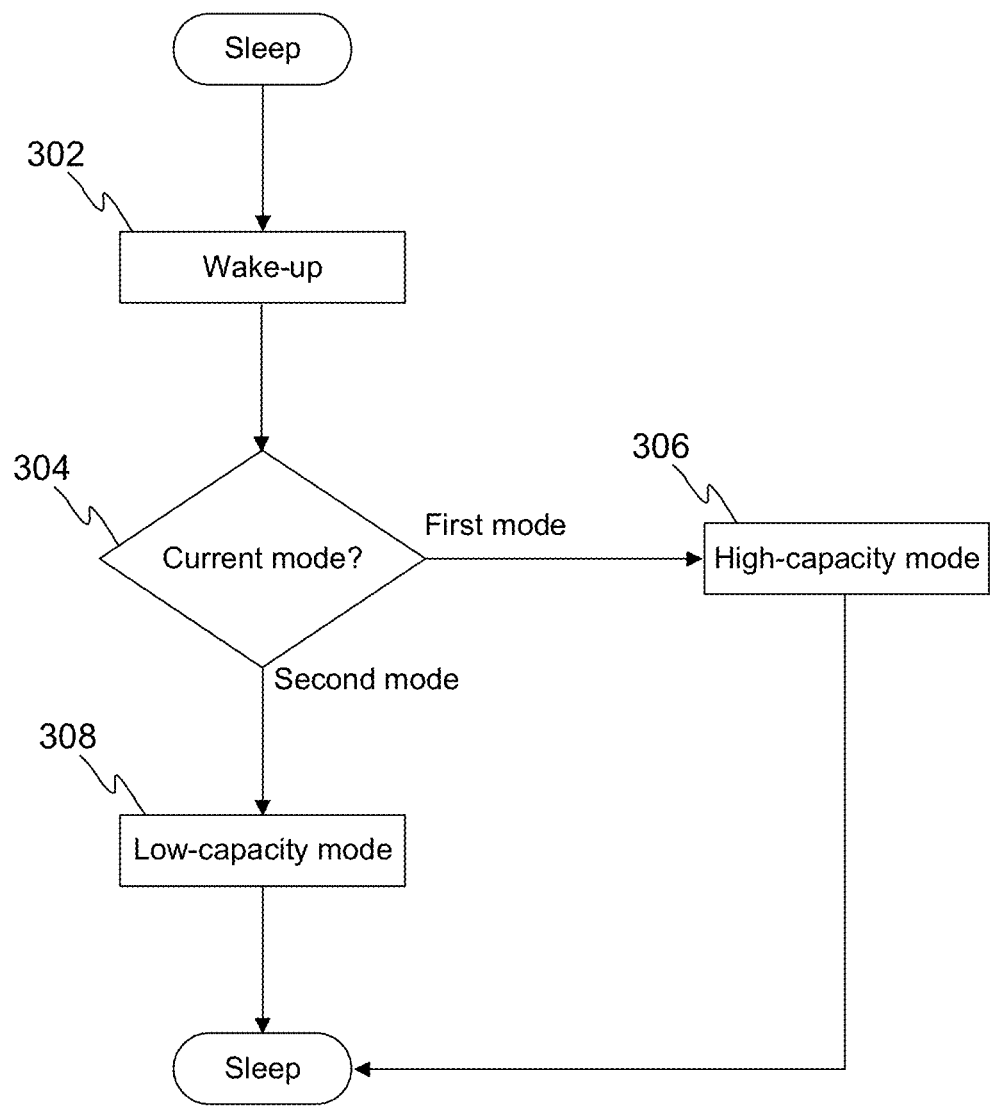

FIG. 3A illustrates a simple example of the method from the perspective of the asset tag device 102. At a step 302 the asset tag device 102 may be waked up with a timer or is woken up by external signaling, e.g. by using so called wake-up radio, i.e. wake-up circuitry. Alternatively or in addition, the one or more asset tag devices 102 may regularly scan on at least one first communication channel for receiving beacon frames. According to one example, the wake-up circuitry may be based on RFID technology, which may detect a special type of external radio transmissions using the received energy of the external radio transmission to power its own wake-up circuitry. The wake-up circuitry may then wake up other circuitries of the asset tag device 102, e.g. another radio that is used for the actual communication.

At a step 304 the asset tag device 102 defines its current operating mode. As an example, two operating modes are defined: a first mode, i.e. the high-capacity mode, e.g. a mode used in warehouse, and a second mode, i.e. low-capacity mode, e.g. "transport mode". The mode information of the asset tag device 102 may be stored in a memory of the asset tag device and applied whenever the asset tag device 102 wakes up. In this example, the first mode means inventory of high number of asset tag devices 102, such as several hundreds or thousands, e.g. 1000, asset tag devices 102, in short time, e.g. one minute, in which case the asset tags proceed to the step 306 high-capacity, discovery method. In this example, the second mode means inventory of lower number of asset tag devices 102 and/or within longer time, e.g. 10 minutes. In this case the asset tag devices 102 proceed to step 308 low-capacity, discovery method. An example of the low-capacity discovery method is that the asset tag devices 102 use BLE advertising protocol and the monitoring device 104 BLE scanning protocol. The use of BLE advertising protocol enables that the asset tag devices 102 use very little power and they may be detected where and when needed. The lower number of asset tag devices 102 and/or longer time available for the discovery in the second mode enables that the asset tag using BLE advertising protocol may be monitored even with a single monitoring device 104, 204 by scanning one or few first communication channels. Another example of the low capacity discovery protocol may be that the asset tag devices 102 may be configured to transmit using the address of a monitoring device 104, 204, e.g. the address of the monitoring device 204 of the container 201 and exchange the needed information with the monitoring device 104, 204.

Figure 3B:
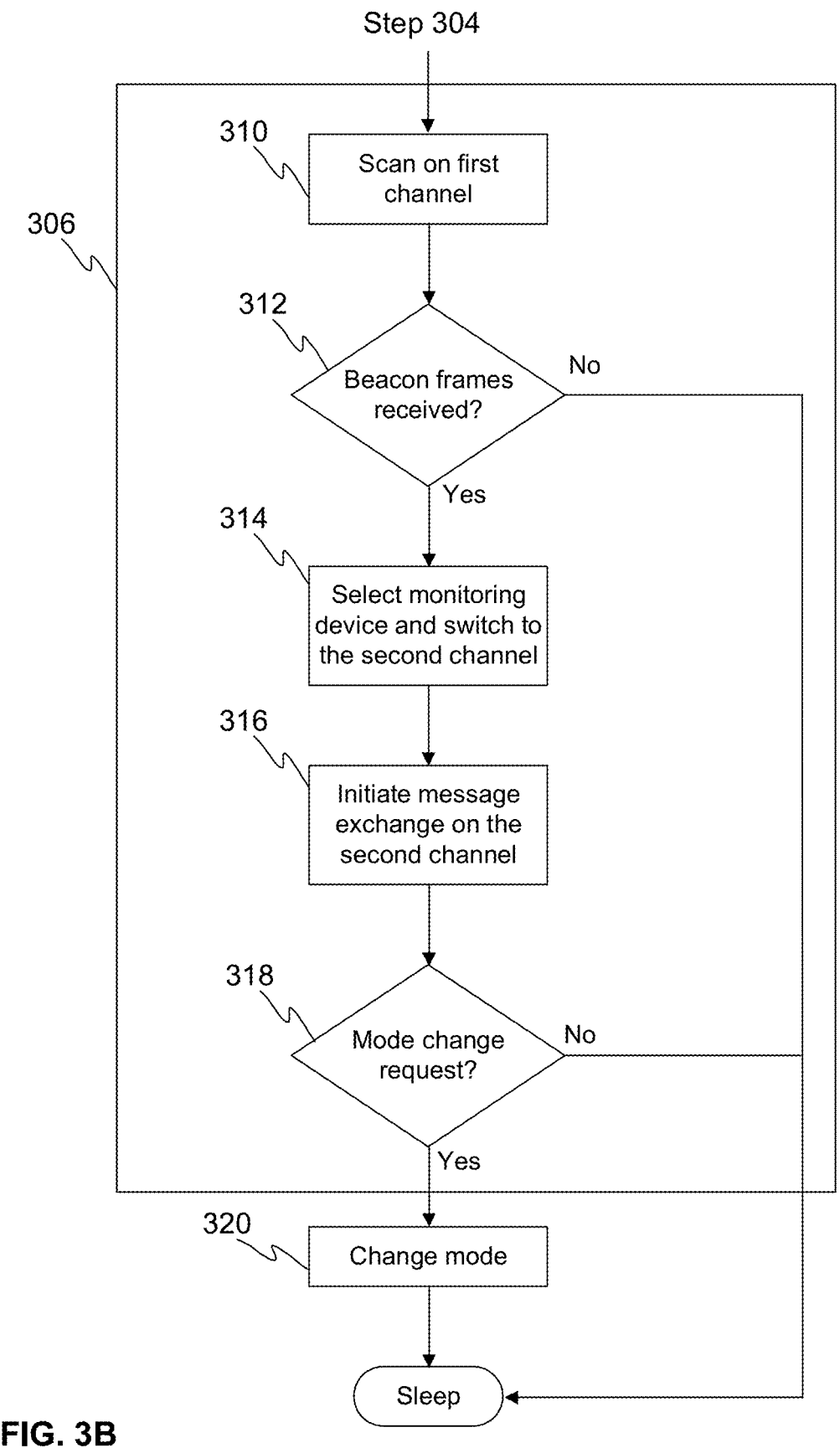

FIG. 3B illustrates the method for discovery of asset tag devices in a dense network from the perspective of the asset tag device 102 more detailed, especially the step 306, i.e. the high-capacity discovery.

At a step 310, the asset tag device 102 scans at least in one first communication channel to receive at least one beacon frame transmitted by one or more monitoring devices 104, 204. The first communication channel may be one or more predefined communication channels, i.e. frequency channels, where the one or more monitoring devices 104, 204 are configured to transmit information, e.g. one or more beacon frames. The beacon frame, i.e. a (broadcasted) radio frame may comprise information about the transmitting monitoring device 104, 204, e.g. a second communication channel, traffic load within the system, e.g. number of asset tag devices 102 served during a predetermined preceding time period, e.g. during last 1 second, etc.

At a step 312, the asset tag device 102 defines if it has received beacon frames from one or more monitoring devices 104, 204. In case there are one or more beacon frames received, the asset tag device 102 proceeds into step 314, wherein the asset tag device 102 selects a monitoring device 104, 204 and switches to a second communication channel indicated in the beacon frame transmitted by the selected monitoring device 104, 204. The second communication channel may be a communication channel, i.e. frequency channel, that the selected monitoring device 104, 204 is configured to listen to catch initialization messages from the one or more asset tag devices 102. The first and second communication channels may be one or more frequency channels in a frequency band, or separate frequency bands. For example, the first communication channels may be frequency channels in 2.4 GHz license-exempt band while the second communication channels may be frequency channels in 5 GHz license-exempt band. Alternatively, the first and second communication channels may be any other separable time-frequency coded wireless communication channels The selection of the monitoring device 104, 204 may be based on various selection criteria. An example of the criteria is the received signal strength and/or quality measured from the beacon frames sent by the one or more monitoring devices 104, 204, and the asset tag device 102 may select the monitoring device 104, 204 from which it receives beacon frame(s) with the highest signal strength. Alternatively or in addition, the monitoring device 104, 204 may indicate the amount of traffic load and/or number of asset tag devices 102 that it has served recently, and the asset tag device 102 may select a monitoring device 104, 204, which has a low load of traffic and/or asset tag devices 102. Alternatively or in addition, the asset tag device 102 may randomize the selection of the monitoring device 104, 204. The randomization may mean that the asset tag device 102 may just pick up the first beacon frame that it receives (expecting the scan start time of the one or more asset tag devices 102 is likely not the same for all of the one or more asset tag devices 102). In case the asset tag device 102 receives multiple beacon frames, the asset tag device 102 may apply randomization in the selection. This means the other selection criteria like signal strength may be fully ignored or used as a weighting factor to increase/decrease the likelihood of the selection. The randomization may help in balancing the load of the monitoring devices 104, 204 and improve the overall system capacity of handling asset tag devices 102 quickly.

At a step 316 the asset tag device 102 initiates communication with the selected monitoring device 104, 204 on the second communication channel, i.e. does a message exchange with the selected monitoring device 104, 204 on the second communication channel. The message exchange may comprise acknowledgement from the monitoring device 104, 204. If the asset tag device 102 does not receive acknowledgement from the monitoring device 104, 204, it may retry to initiate message exchange. Furthermore, the asset tag device 102 may define at step 318 if the monitoring device 104, 204 instructs the asset tag to take some actions. Such actions may be, for example changing the operating mode of the asset tag device 102, e.g. the asset tag device 102 may be instructed to switch from the first mode, i.e. high-capacity mode, e.g. "warehouse mode", into the second mode, i.e. low-capacity mode, e.g. "transport mode". Alternatively or in addition, the selected monitoring device 104, 204 may instruct the asset tag device 102 to go to sleep. Alternatively or in addition, the selected monitoring device 104, 204 may instruct the asset tag device 102 to wait for a predefined time before entering the second mode. For example, the monitoring device 104, 204 may instruct the asset tag device 102 to run one-hour sleep timer and after one hour start BLE advertising protocol using 1 second advertising interval.

At a step 320 the asset tag device 102 implements the instructions from the monitoring device 104, 204, for example the asset tag device 102 switches from the first operating mode into the second operating mode.

FIG. 3C illustrates one example of the method for discovery of asset tag devices from the perspective of the asset tag device 102. After selecting the monitoring device and switching to the second channel at the step 314, the asset tag device 102 may apply a random delay (step 322) and/or the asset tag device 102 may define (step 324) if it needs to use a Clear Channel Assessment (CCA), i.e. listen if the second communication channel is free for transmission, before proceeding to step 316. If the asset tag device 102 needs to use CCA it at a step 326 the asset tag device 102 performs the CCA, i.e. listens transmission on the second communication channel during a predetermined CCA period before initiating the communication with the selected monitoring device 104, 204. At a step 328 the asset tag device 102 defines if the CCA resulted in free communication channel. If the CCA result is that the communication channel is not free, i.e. in response to detection of other transmission during the predetermined period, the asset tag device 102 may define a need for retry the CCA (step 330) and the need for CCA (step 324) may be defined again after a random delay, i.e. the asset tag device 102 waits before defining again if it needs to use CCA. If the CCA results in that communication channel is free, i.e. in response to detection of no other transmissions during the predetermined period, the asset tag device 102 proceeds to step 316, i.e. initiating the communication with the selected monitoring device 104, 204 as discussed above. The message exchange may comprise acknowledgement from the monitoring device 104, 204. If the asset tag device 102 does not receive acknowledgement, it may retry to initiate message exchange or retry the CCA, i.e. proceed to step 330.

Figure 3D:
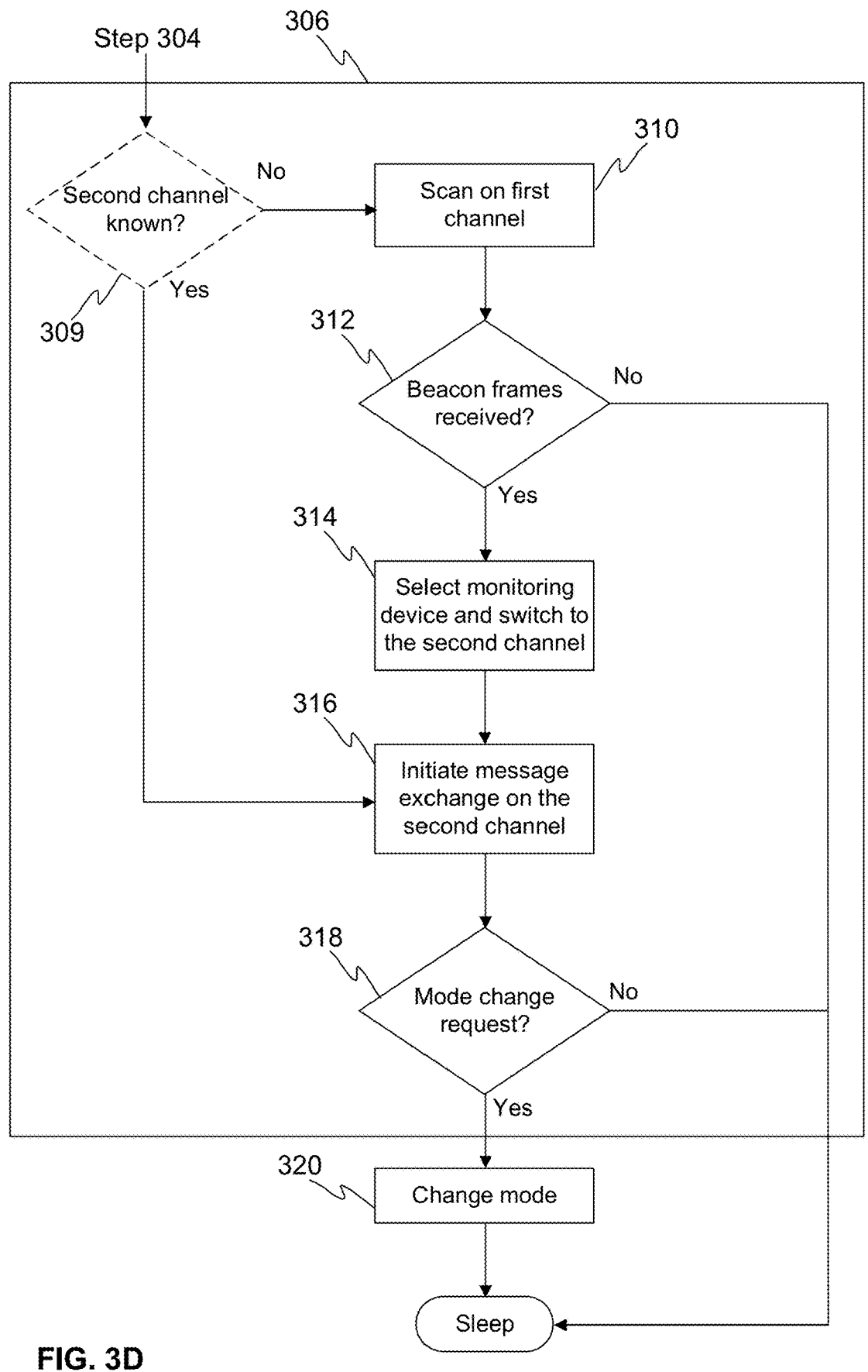
Figure 3E:
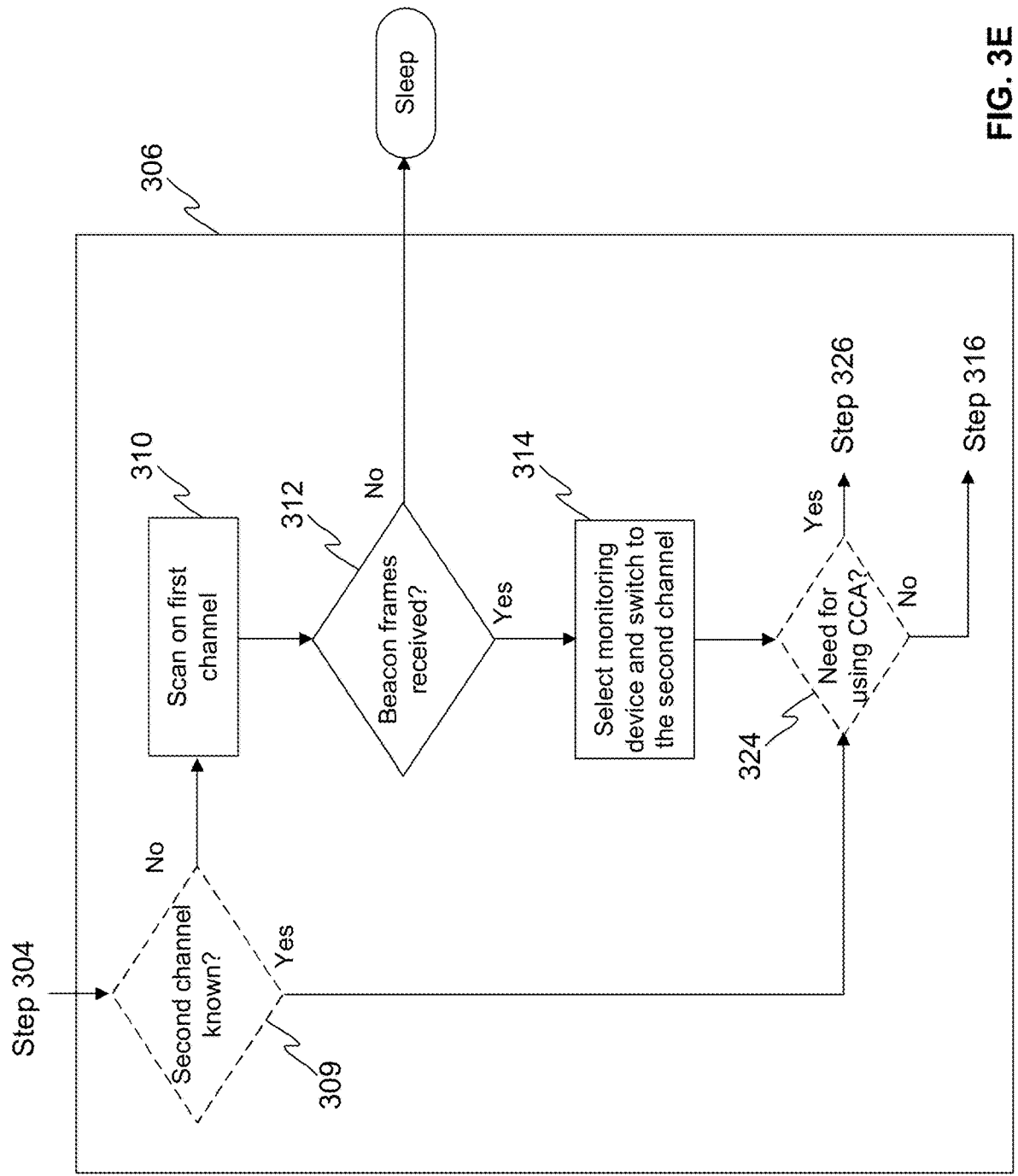

FIGS. 3D-3E illustrate examples of the method according to the invention, wherein the asset tag device is configured to define if it knows a second communication channel without scanning on the first channel. At a step 309 the asset tag device 102 may define if it knows a second communication channel, for example the second communication channel is preconfigured or the asset tag device 102 is configured to randomize the second communication channel from a set of second communication channels, for example a frequency channel that may be used for communicating with one or more monitoring device 104, 204. If the asset tag device 102 knows or is configured to randomize the second communication channel from a set of second communication channels, it may skip the steps 310 to 314 and proceed to step 316 or 324 after a random delay. The random delay is applied to reduce possible collisions of messages transmitted by the asset tag devices 102. If the asset tag device 102 does not know or randomize the selection of the second communication channel, it will proceed into step 310 to scan for beacon frames as discussed above. FIG. 3D illustrates one example, wherein the asset tag device 102 proceeds after a random delay to initiating communication with the monitoring device 104, 204 on the second communication channel (step 316) in response to that the asset tag device 102 knows or is configured to randomize the second communication channel from a set of second communication channel. FIG. 3E illustrates another example, wherein the asset tag device 102 proceeds after a random delay to defining if the asset tag device 102 needs to use the CCA as discussed above (step 324) in response to that the asset tag device 102 knows or is configured to randomize the second communication channel from a set of second communication channel. After the step 324 the method continues as discussed above referring to FIG. 3C, but for clarity reasons those steps are not shown in FIG. 3E.

Figure 4A:
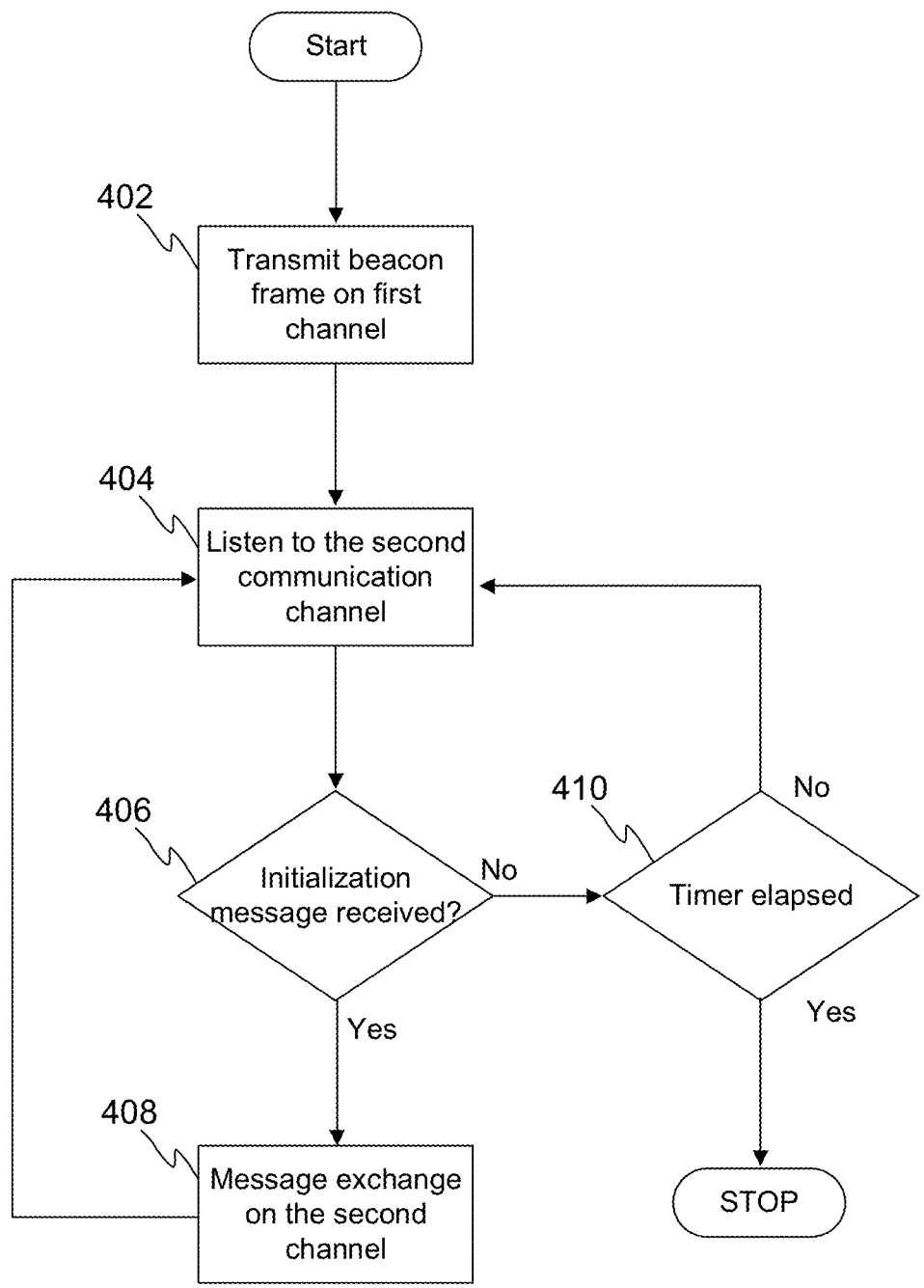
FIGS. 4A-4B schematically illustrate examples of a method for discovery of asset tag devices according to the invention from the perspective of a monitoring device.
Figure 4B:
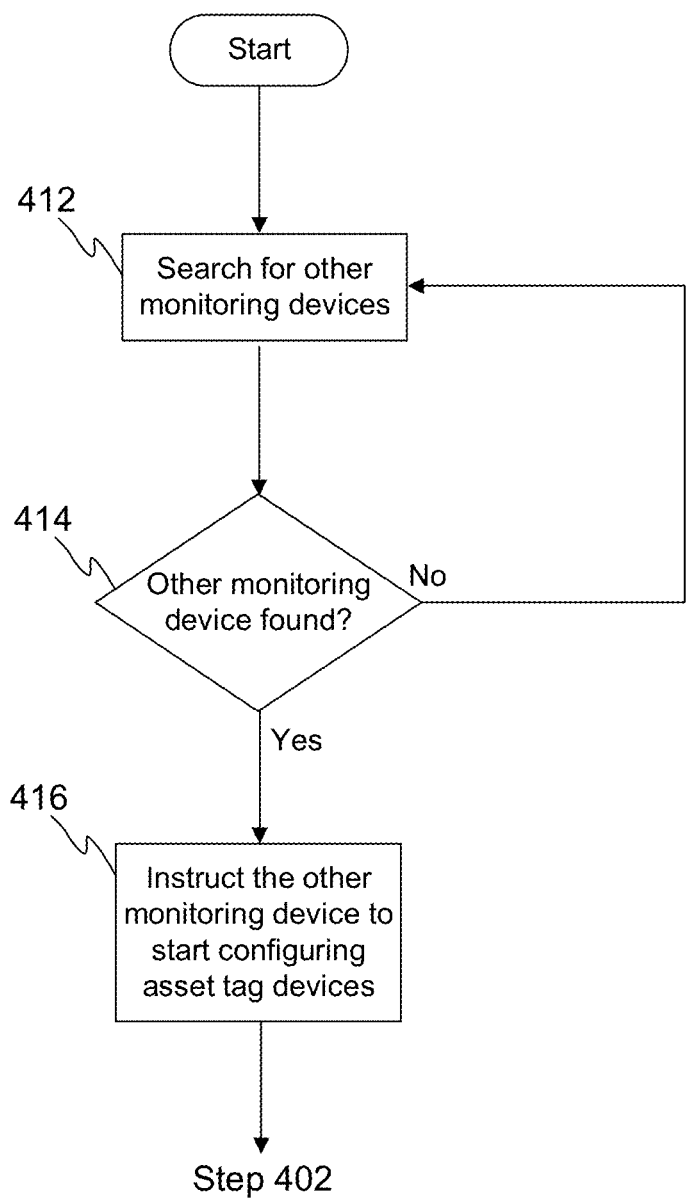

FIGS. 4A-4B schematically illustrate examples of a method for discovery of asset tag devices 102 in a dense network, according to the invention from the perspective of the monitoring device 104, 204.

FIG. 4A illustrates a simple example of the method from the perspective of the monitoring device 104, 204. At a step 402, the monitoring device 104, 204 transmits at least one beacon frame on at least one first communication channel at least once per a beacon interval. The beacon frame may comprise information about the second communication channel. The monitoring device 104, 204 may define the second communication channel, i.e. the communication channel on which it listens for receiving an initialization message from one or more asset tag devices 102, before transmitting the beacon frame. The monitoring device 104, 204 may also start a beacon interval timer before transmitting the beacon frame. The monitoring device 104, 204 may define the second communication channel by using channel sensing, randomisation, and/or channel information received from the other monitoring devices. Alternatively or in addition, the monitoring device 104, 204 may be configured to define a specific second communication channel or set of second communication channels. It is characteristic for the system 100, 200 according to the invention that the asset tag device 102 discovery capacity may be improved by increasing the number of monitoring devices 104, 204. Alternatively or in addition, it is characteristic for the system 100, 200 according to the invention that the monitoring devices 104, 204 may be configured to define the second communication channel which has low usage within its neighbourhood, i.e. within its communication range. The communication range of a monitoring device 104, 204 refers to a range within which the monitoring device 104, 204 is able to detect or receive radio transmissions, e.g. beacon frames, transmitted by other devices, e.g. another monitoring device or one or more asset tag devices 102.

Beacon interval is a time interval the monitoring device 104 transmits one or more beacon frames repeatedly. Beacon interval length may be fixed, or the monitoring device 104, 204 may adjust it. The more often the beacon frames are transmitted, the shorter is the needed scan duration, i.e. the first channel scan duration, that the asset tag devices 102 need to receive at least one beacon frame in a single scan.

When the asset tag devices 102 cannot hear any beacon frames from the monitoring devices 104, 204, e.g. when the asset tag devices 102 are out of communication range of the monitoring devices 104, 204, they need to scan repeatedly, using a scan interval, in order to discover the monitoring devices 104, 204, i.e. in order to hear at least one or more beacon frames from the monitoring devices 104, 204. The scan duration and scan interval lengths may be fixed, or the asset tag device 102 may adjust them.

The scan duration and scan interval affect the power consumption of an asset tag device 102. The longer the scan duration is and/or the shorter the scan interval is, the higher the power consumption of an asset tag device 102 is, and vice versa. On the other hand, the longer the scan interval is and/or the lower the probability to hear beacon frames in one scan is, the longer it takes for an asset tag device 102 to discover the monitoring devices 104, 204, i.e. hear their beacon frames, when entering the communication range, i.e. radio range, of the monitoring devices 104, 204.

Preferably, the scan duration, scan interval, and beacon interval is chosen so that they fulfill system target parameters, i.e. asset tag device power consumption and the delay how fast asset tag devices 102 may discover monitoring devices 104, 204 when entering the communication range of the monitoring devices 104, 204.

As there may be locally, i.e. within the communication range of the monitoring device 104, 204, more than one monitoring device 104, 204, the beacon interval may be adjusted accordingly. As an example, the beacon interval length may be defined, by the monitoring device 104, 204, according to the following formula:

$$\text{beacon interval length} = \text{timegrid} * \text{local number of monitoring devices,}$$

wherein the timegrid is equal or shorter than the first channel scan duration. The timegrid is a time interval during which at least one monitoring device 104, 204 within its communication range is configured to send a beacon frame whilst individual monitoring device 104, 204 may transmit beacon frames more seldom using beacon interval length interval. The beacon transmissions may be synchronized in a way that beacon frames of multiple monitoring devices 104, 204 are transmitted exactly with the timegrid interval. In this case, an asset tag device 102 scan duration is at least timegrid length but does not necessarily need to be longer than the timegrid length, in order to hear at least one beacon frame from the monitoring devices 104, 204. On the other hand, the beacon frame transmissions of the monitoring devices 104, 204 may be unsynchronized or randomized. In this case, an asset tag device 102 scan duration is chosen/adjusted so that a single scan duration provides high enough probability to hear at least on beacon frame from the monitoring devices 104, 204.

For example, if the beacon frames of the monitoring devices 104, 204 are synchronized, as described above, the timegrid may be set to 10 ms, and the desired first channel scan duration may be set to 10 ms. As an example, local number of monitoring devices may be fifteen, and therefore the beacon interval length=10 ms*15=150 ms. In other words, the monitoring devices 104, 204 do not need to send beacon frame more often than once in 150 ms and yet the asset tag devices 102 have high probability of receiving at least one beacon frame by scanning duration of 10 ms time, or multiple beacon frames by scanning for example, duration of 50 ms time. Frequent transmission of beacon frames enables substantially short scan durations, i.e. first channel scan durations, of the one or more asset tag devices 102. The monitoring device 104, 204 may define the beacon interval length before transmitting the beacon frame.

The monitoring devices 104, 204 may obtain from beacon frames the local number of monitoring devices 104, 204 and frequency channels used by these devices. The monitoring devices 104, 204 may perform this by listening periodically their radio neighborhood, i.e. radio communication range, and detect beacon frames transmitted by other monitoring devices 104, 204. The term "neighbourhood of a device" mean one or more devices whose radio transmissions may be detected by the receiving device. Monitoring device 104, 204 may include the identity of the other detected monitoring devices 104, 204 and used frequency channel into the beacon frame. This enables automatic and adaptive configuration of beacon interval is e.g. warehouses, but still maintaining the desired timegrid value for the asset tag devices 102. Alternatively, the it may be decided to utilize other beacon frame to distribute information between the monitoring devices 104, 204, to minimize beacon frame length used for asset tag devices 102 as well as to utilize different transmission period for optimizing monitoring devices 104, 204 neighborhood information.

At a step 404, the monitoring device 104, 204 listens to the second communication channel for receiving an initialization message from one or more asset tag devices 102. The monitoring device 104, 204 listens to the second communication channel, except when it is transmitting one or more beacon frames on the first communication channel or has other duties. If the monitoring device 104, 204 receives 406 an initialization message, the monitoring device 104, 204 proceeds to perform 408 a message exchange, i.e. communication, with the asset tag device 102 from which the initialization message is received. If no initialization message is received 406 the monitoring device 104 continues listening to the second communication channel until the beacon interval elapses 410.

FIG. 4B schematically illustrates another example of the method for discovery of asset tag devices 102 in a dense network from the perspective of the monitoring device 104, 204. In this example the system 100, 200 further comprises one or more second monitoring devices 204 attached to the containers 201 as discussed above in the example referring to FIG. 2. At a step 412 a monitoring device 104 is searching for a second monitoring device 204, e.g. a monitoring device 204 attached to a container 201. At a step 414 a second monitoring device 204 is found. At a step 416 the first monitoring device 104 instructs the second monitoring device 204 to start configuring asset tag devices 102 as described above by referring to FIG. 4A. For example, the second monitoring device 204 may be instructed to configure asset tag devices 102 within its operation range and/or using specific addresses that the asset devices 102 are configured to use to switch the one or more asset tag devices 102 to a second operating mode.

Figure 5:
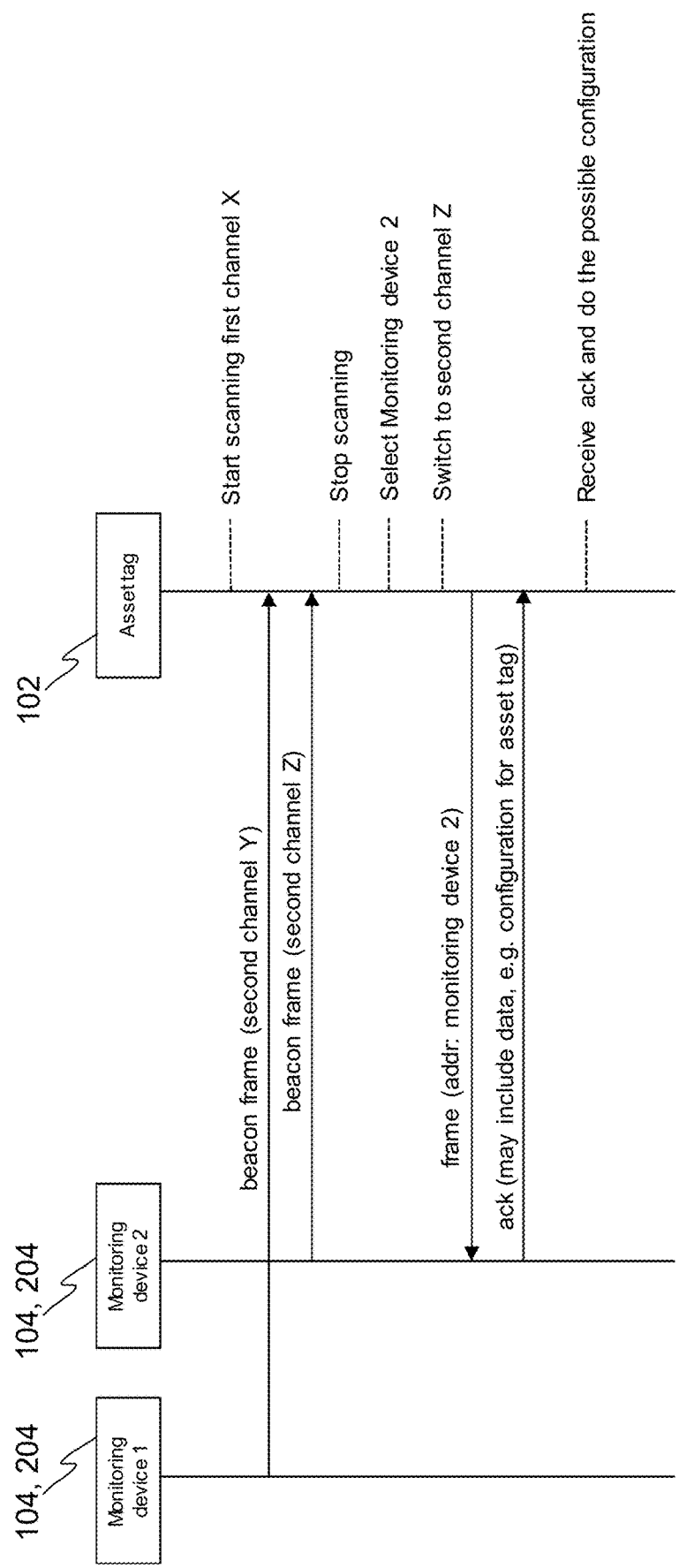
FIG. 5 schematically illustrates an example of the message exchange between one or more monitoring devices and an asset tag device.

FIG. 5 schematically illustrates an example of the message exchange between one or more monitoring devices 104, 204 and an asset tag device 102. In this example the system 100, 200 comprises two monitoring devices 104, 204, monitoring device 1 and monitoring device 2. The monitoring device 1 transmits on a first communication channel a beacon frame comprising information of a second communication channel Y that the monitoring device 1 has defined. The monitoring device 2 transmits on the first communication channel a beacon frame comprising information of a second communication channel Z that the monitoring device 2 has defined. The asset tag device 102 scans the first communication channel and selects the monitoring device 2 based on the at least one selection criterion as described above. The asset tag device 102 switches to the second channel Z indicated in the beacon frame received from the monitoring device 2 and transmits an initialization message to the monitoring device 2 to initiate the communication between the asset tag device 102 and the monitoring device 2. The initialization message may be used by the monitoring device 2 to discover the asset tag device 102 and used for example for inventory purposes. The monitoring device 2 transmits an acknowledgement to the asset tag device 102. Upon receiving an acknowledgement from the monitoring device 2 the asset tag device 102 may stop further transmissions in order to not to load the second channel further leaving the communication capacity to the other devices. Furthermore, the asset tag device 102 may receive instructions, which may be embedded in the acknowledgement or in separate messages, from the monitoring device 2 to take some actions. Such actions may be, for example changing the operating mode of the asset tag device 102 from the first mode to the second mode as discussed above.

Figure 6A:
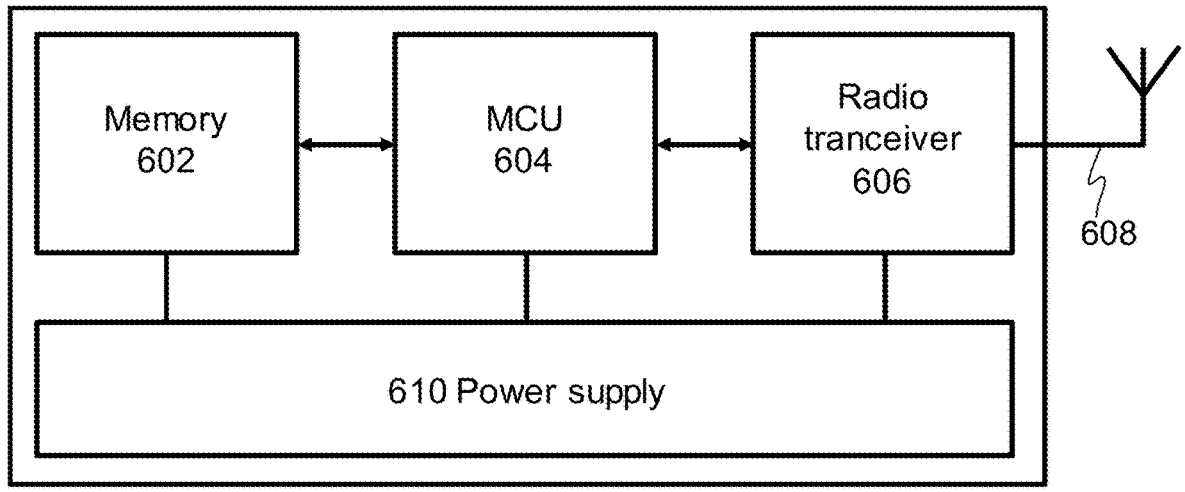
FIGS. 6A-6B illustrate schematically examples of a hardware architectures of an asset tag device according to the invention.

FIG. 6A illustrates schematically an example of a hardware architecture of an asset tag device 102 according to the invention. The asset tag device (apparatus) 102 comprises a memory 602, a microcontroller unit (MCU) 604, a radio transceiver 606, an antenna 608, and a power supply 610. The MCU 604 may be used to run a computer program (code) for a possible application and communication protocol. The asset tag device 102 uses the radio transceiver 606 in order to transmit data to and/or receive data from one or more monitoring devices 104, and to transmit communication frames via the antenna 608. The power supply 610 comprises components for powering the device, e.g. a battery and a regulator.

Figure 6B:
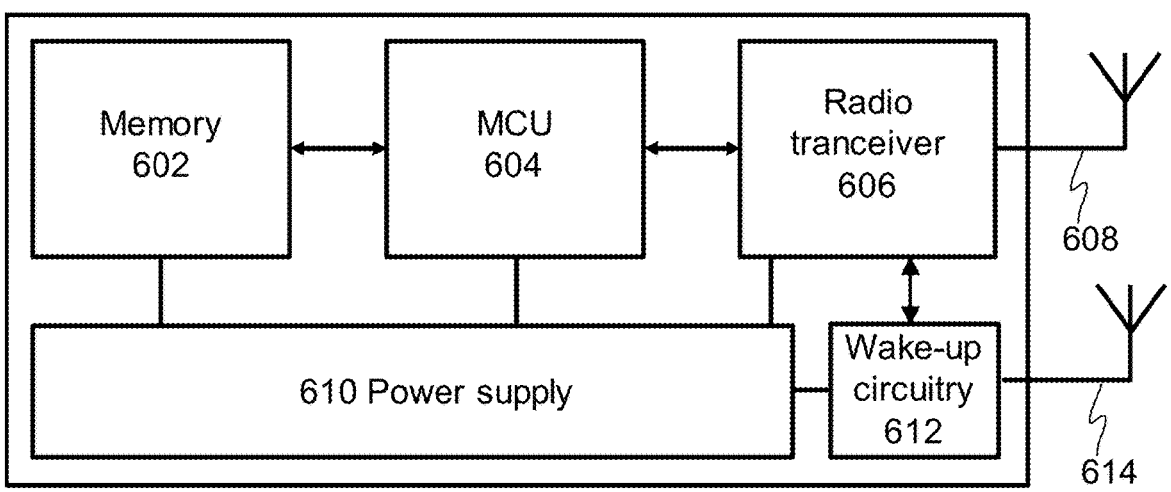

FIG. 6B illustrate schematically another example of a hardware architecture of an asset tag device 102 according to the invention. The hardware architecture of the asset tag device 102 of this example is otherwise similar to the example hardware architecture illustrated in FIG. 6A, but the asset tag device 102 further comprises a wake-up circuitry 612 and an antenna 614 of the wake-up circuitry 612. The wake-up circuitry 612 may be used to wake-up the asset tag device 102 as described above.

The memory 602 of the asset tag device 102 may comprise the computer program, which is configured to perform at least the actions of the asset tag device 102 presented in this application, when it is run in a computer, e.g. in the asset tag device 102, by means of the MCU 604.

Such an action may be the scan of at least one first communication channel to receive at least one beacon frame transmitted by one or more monitoring devices 104, 204 by using the radio transceiver 606.

In addition, such an action may be the selection of a monitoring device 104, 204 based on at least one selection criterion by using the MCU 604.

In addition, such an action may be the switching to the second communication channel indicated in the beacon frame transmitted by the selected monitoring device 104, 204 by using the radio transceiver 606.

In addition, such an action may be the initialization of communication with the selected monitoring device 104, 204 on the second communication channel by using the radio transceiver 606.

In addition, such an action may be the communication with the selected monitoring device 104, 204 on the second communication channel by using the radio transceiver 606.

In addition, such an action may be the switching from the first operating mode into the second operating mode by using the MCU 604.

In addition, such an action may be the waking-up of the asset tag device 102 by using the wake-up circuitry 612.

In addition, such an action may be the application of a random delay by using the MCU 604.

In addition, such an action may be the definition of need to use the CCA, i.e. listen if the second communication channel is free for transmission, by using the MCU 604.

In addition, such an action may be the use of the CCA, i.e. listen if the second communication channel is free for transmission, by using the radio transceiver 606.

The computer program may be stored in a tangible non-volatile computer readable medium, e.g. an USB stick or a CD-ROM disc.

Figure 7A:
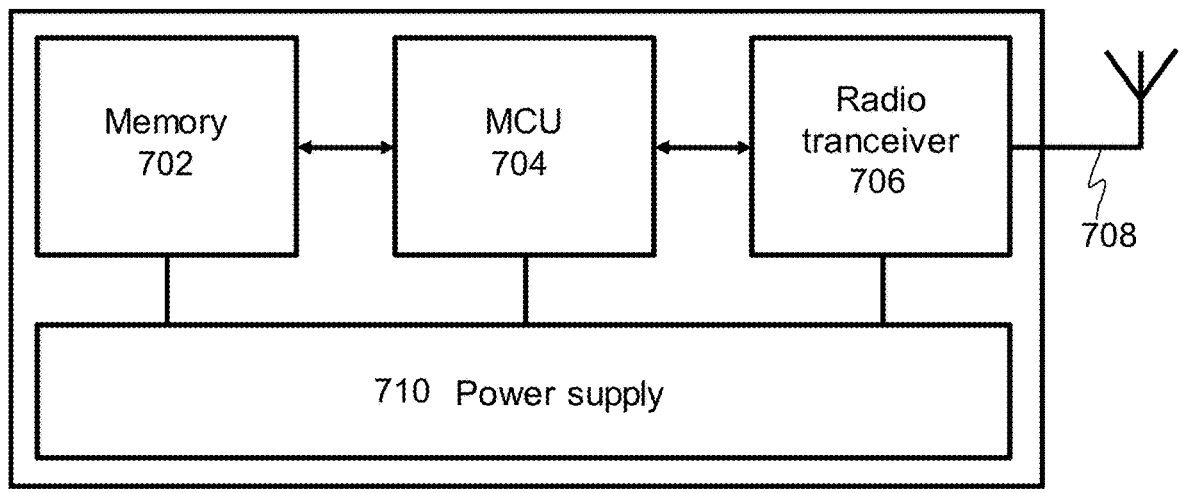
FIGS. 7A-7B illustrate schematically an example of a hardware architecture of a monitoring device according to the invention.

FIG. 7 illustrate schematically an example of a hardware architecture of a monitoring device 104, 204 according to the invention. The monitoring device (apparatus) 104, 204 comprises a memory 702, a microcontroller unit (MCU) 704, one or more radio transceivers 706, an antenna 708, and a power supply 710. The MCU 704 may be used to run a computer program (code) for a possible application and communication protocol. The monitoring device 104, 204 uses the one or more radio transceivers 706 in order to transmit and receive data between one or more monitoring devices 104, 204 and/or one or more asset tag devices 102, and to transmit communication frames via the antenna 708. The power supply 710 comprises components for powering the device.

An implementation variant of the monitoring device 104, 204 with more than one radio transceiver 706 may be used transmit and/or receive data between one or more monitoring devices 104, 204 and/or one or more asset tag devices 102 simultaneously. The monitoring device 104, 204 with more than one radio transceiver 706 may communicate on multiple first and second channels concurrently.

Figure 7B:
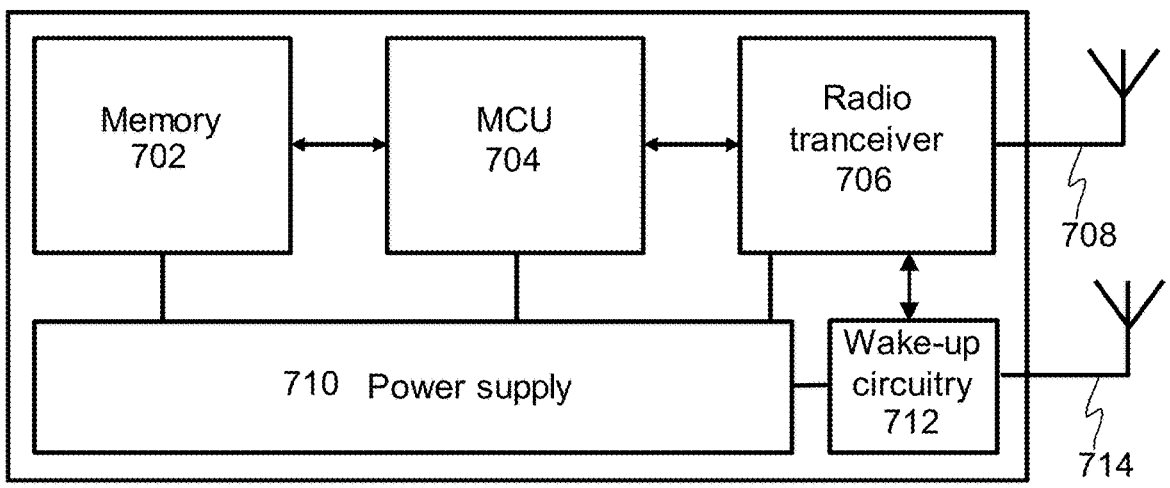

FIG. 7B illustrate schematically another example of a hardware architecture of a monitoring device 104, 204 according to the invention. The hardware architecture of the monitoring device 104, 204 of this example is otherwise similar to the example hardware architecture illustrated in FIG. 7A, but the monitoring device 104, 204 further comprises a wake-up circuitry 712 and an antenna 714 of the wake-up circuitry 712. The wake-up circuitry 712 may be configured to receive an external signal and to wake up other circuitries of the monitoring device 104, 204 itself. Alternatively or in addition, the wake-up circuitry 712 may be configured to generate a signal that is transmitted to wake up some other devices, i.e. the wake-up circuitries of the other devices, for example the wake-up circuitry 612 of one or more asset tag devices 102.

The memory 702 comprises the computer program, which is configured to perform at least the actions of the monitoring device 104, 204 presented in this application, when it is run in a computer, e.g. in the monitoring device 104, 204 by means of the MCU 704.

Such an action may be the transmission of the beacon frame on at least one first communication channel by using the one or more radio transceivers 706.

In addition, such an action may be the listening to the second communication channel by using the one or more radio transceivers 706.

In addition, such an action may be the communication with the one or more asset tag devices 102 on the second communication channel by using the one or more radio transceivers 706.

In addition, such an action may be the definition of the second communication channel by using the MCU 704.

In addition, such an action may be the definition of the beacon interval length by using the MCU 704.

In addition, such an action may be the start of a beacon interval timer by using the MCU 704.

In addition, such an action may be the search for a second monitoring device 204, e.g. a monitoring device 204 attached to a container 201, by using the one or more radio transceivers 706.

In addition, such an action may be the instruction of the second monitoring device 204 to start configuring asset tag devices 102 by using the one or more radio transceivers 706.

The computer program may be stored in a tangible non-volatile computer readable medium, e.g. an USB stick or a CD-ROM disc.

The method for discovery of asset tag devices discussed above improve the discovery of asset tag devices in a dense wireless network.

An asset tag device 102 refers throughout this application to a battery-operated low-cost module that may be attached to any desired asset. Asset tag device 102 configured in the high-capacity mode does not broadcast, e.g. like advertising BLE tag devices, which means that the asset tag device 102 does not cause interference or collisions on the communication channels even if the number of the asset tag devices 102 is high. The number of asset tag devices 102 may be very high, such as hundreds or thousands of asset tag devices 102. The asset is not limited to literally an asset, but such asset tag devices may be attached with various things, including animals and people.

A monitoring device 104 refers throughout this application to a device that is used to detect and monitor the one or more asset tag devices (or other monitoring devices). Preferably, the monitoring device 104 is mains-powered.

A second monitoring device 204 refers throughout this application to a device that is used to detect and monitor the one or more asset tag devices (or other monitoring devices). Preferably, the second monitoring device 104 is mains-powered. Alternatively or in addition, one or more asset tag devices 102 may be configured to change its role into a second monitoring device 204, even if the one or more asset tag devices 102 are not mains powered.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless communication system, comprising:
one or more monitoring devices; and
one or more asset tag devices, configured to operate in a high-capacity mode for an inventory of a first number of asset tag devices within a first amount of time, and a low-capacity mode for inventory of a second number of asset tag devices within a second amount of time, said second number of asset tag devices being fewer than said first number of asset tag devices, and said second amount of time being longer than said first amount of time,
wherein the one or more monitoring devices are configured to:
transmit at least one beacon frame on at least one first communication channel, at beacon intervals, each beacon frame comprising information of a second communication channel, wherein the second communication channel is unoccupied by said beacon frames, and
listen to the second communication channel,
wherein the one or more asset tag devices, operating in the high-capacity mode, are configured to:
scan at least one first communication channel to receive at least one beacon frame transmitted by the one or more monitoring devices,
select a monitoring device from the one or more monitoring devices based on at least one selection criterion,
switch to the second communication channel indicated in the beacon frame received from the selected monitoring device, and
initiate communication with the selected monitoring device on the second communication channel,
wherein the selected monitoring device is further configured to perform communication with the one or more asset tag devices on the second communication channel in response to receiving an initialization message from the one or more asset tag devices,
wherein the communication on the second communication channel includes at least an instruction from the selected monitoring device that instructs the one or more asset tag devices to switch from the high-capacity mode to the low-capacity mode,
wherein the one or more asset tag devices are configured to switch from the high-capacity mode to the low-capacity mode, and
wherein the one or more asset tag devices, operating in the low-capacity mode, are configured to transmit using an address of a second monitoring device.

2. The system according to claim 1, wherein a beacon interval length is defined based on the number of local monitoring devices transmitting beacon frames.

3. The system according to claim 1, wherein a beacon interval length is defined according to a desired first channel scan duration and interval of the asset tag devices.

4. The system according to claim 1, wherein the at least one selection criterion comprises a signal strength of received beacon frames, quality of the one or more monitoring devices, traffic load of the one or more monitoring devices, and/or randomizing.

5. The system according to claim 1, wherein the one or more asset tag devices are configured to wake up in response to a timer or to receiving a radio transmission before the scan of at least one first communication channel.

6. The system according to claim 1, wherein the one or more asset tag devices are configured to listen to transmissions on the second communication channel during a predetermined period before initiating the communication with the selected monitoring device, and are further configured to initiate the communication with the selected monitoring device in response to detection of no other transmissions during the predetermined period the one or more asset tag devices.

7. The system according to claim 1, wherein in response to receiving the initialization message from the one or more asset tag devices, the selected monitoring device communicates with the one or more asset tag devices on the second communication channel at least to instruct the asset tag device to stop scanning activities for a time period.

8. The system according to claim 2, wherein the beacon interval length is further defined according to a desired first channel scan duration and interval of the asset tag devices.

9. The system according to claim 2, wherein the at least one selection criterion comprises a signal strength of received beacon frames, quality of the one or more monitoring devices, traffic load of the one or more monitoring devices, and/or randomizing.

10. The system according to claim 3, wherein the at least one selection criterion comprises a signal strength of received beacon frames, quality of the one or more monitoring devices, traffic load of the one or more monitoring devices, and/or randomizing.

11. An asset tag device for a wireless communication system, comprising:
a microcontroller; and
a radio transceiver,
wherein the asset tag device configured to operate in either of a high-capacity mode for an inventory of a first number of asset tag devices within a first amount of time, and a low-capacity mode for inventory of a second number of asset tag devices within a second amount of time, said second number of asset tag devices being fewer than said first number of asset tag devices, and said second amount of time being longer than said first amount of time, and
wherein the asset tag device when in the high-capacity mode is configured to:
scan, via the radio transceiver, at least one first communication channel to receive at least one beacon frame transmitted by one or more monitoring devices, select, via the microcontroller, a monitoring device from the one or more monitoring devices based on at least one selection criterion, switch, via the microcontroller, to a second communication channel indicated in the beacon frame received from the selected monitoring device, wherein the second communication channel is unoccupied by said beacon frames, initiate, via the radio transceiver, communication with the selected monitoring device on the second communication channel including at least an instruction from the selected monitoring device to instruct the asset tag device to switch from the high-capacity mode to the low-capacity mode, and switch from the high-capacity mode to the low-capacity mode, wherein the asset tag device when in the low-capacity mode is configured to transmit using an address of a second monitoring device.

12. A discovery method for the asset tag device of claim 11, of a wireless communication system, wherein the asset tag device has a high-capacity mode for an inventory of a first number of asset tag devices within a first amount of time, and a low-capacity mode for inventory of a second number of asset tag devices within a second amount of time, said second number of asset tag devices being fewer than said first number of asset tag devices, and said second amount of time being longer than said first amount of time, wherein the method comprises:

scanning at least one first communication channel to receive at least one beacon frame transmitted from one or more monitoring devices;

selecting a monitoring device based on at least one selection criterion, in response to receiving at least one beacon frame;

switching to the second communication channel indicated in the beacon frame received from the selected monitoring device, wherein the second communication channel is unoccupied by said beacon frames;

initiating communication with the selected monitoring device on the second communication channel, wherein the communication on the second communication channel comprises at least an instruction to the asset tag device to switch from the high-capacity mode to the low-capacity mode; and switching from the high-capacity mode to the low-capacity mode, wherein the asset tag device, operating in the low-capacity mode, transmits using an address of a second monitoring device.

13. A non-transitory computer-readable recording medium having recorded thereon a computer program configured to cause, upon execution by a processor of a computer device, the computer device to perform the method of claim 12.

14. A monitoring device for a wireless communication system, comprising:

a microcontroller; and one or more radio transceivers, wherein the monitoring device is configured to:

transmit, via the one or more radio transceivers, at least one beacon frame on at least one first communication channel, at beacon intervals, each beacon frame comprising information of a second communication channel, wherein the second communication channel is unoccupied by said beacon frames, listen, via the one or more radio transceivers, to the second communication channel, and communicate, via a communication using the one or more radio transceivers, with one or more asset tag devices on the second communication channel in response to receiving an initialization message from the one or more asset tag devices, wherein the one or more asset tag devices are each configured to switchably operate in either of a high-capacity mode for an inventory of a first number of asset tag devices within a first amount of time, and a low-capacity mode for inventory of a second number of asset tag devices within a second amount of time, said second number of asset tag devices being fewer than said first number of asset tag devices, and said second amount of time being longer than said first amount of time, wherein the communication on the second communication channel comprises at least an instruction from the monitoring device to the one or more asset tag devices to switch from the high-capacity mode to the low-capacity mode.

15. The monitoring device according to claim 14, the monitoring device being attached to a container that contains one or more asset tag devices.

16. A discovery method for a monitoring device of claim 14, of a wireless communication system, wherein the method comprises:

transmitting at least one beacon frame on at least one first communication channel, at beacon intervals, the beacon frame comprising information of a second communication channel, wherein the second communication channel is unoccupied by said beacon frames;

listening to the second communication channel; and communicating with the one or more asset tag devices via communication on the second communication channel in response to receiving an initialization message from one or more asset tag devices, wherein the one or more asset tag devices have a high-capacity mode for an inventory of a first number of asset tag devices within a first amount of time, and a low-capacity mode for inventory of a second number of asset tag devices within a second amount of time, said second number of asset tag devices being fewer than said first number of asset tag devices, and said second amount of time being longer than said first amount of time, wherein the communication with the one or more asset tag devices on the second communication channel includes at least an instruction from the monitoring device to the asset tag device to switch from the high-capacity mode to the low-capacity mode.

17. A non-transitory computer-readable recording medium having recorded thereon a computer program configured to cause, upon execution by a processor of a computer device, the computer device to perform the method of claim 16.

* * * * *